(12) United States Patent
Ye et al.

(10) Patent No.: US 11,356,182 B2
(45) Date of Patent: Jun. 7, 2022

(54) METHOD, DEVICE, APPARATUS AND COMPUTER-READABLE MEDIUM FOR SIGNAL EQUALIZATION

(71) Applicant: Nokia Solutions and Networks Oy, Espoo (FI)

(72) Inventors: Chenhui Ye, Shanghai (CN); Xiaofeng Hu, Shanghai (CN); Kaibin Zhang, Shanghai (CN)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 17/137,475

(22) Filed: Dec. 30, 2020

(65) Prior Publication Data

US 2021/0211205 A1    Jul. 8, 2021

(30) Foreign Application Priority Data

Jan. 2, 2020   (CN) .......................... 202010002953.7

(51) Int. Cl.
*H04Q 11/00*      (2006.01)
*H04B 10/69*      (2013.01)

(52) U.S. Cl.
CPC ..... *H04B 10/6971* (2013.01); *H04Q 11/0067* (2013.01); *H04Q 2213/054* (2013.01)

(58) Field of Classification Search
CPC ............... H04B 10/27; H04B 10/6971; H04Q 11/0067; H04Q 2213/054
See application file for complete search history.

(56) References Cited

U.S. PATENT DOCUMENTS

| 10,466,301 | B1* | 11/2019 | Lee ................... | G01R 31/31703 |
| 2015/0003225 | A1* | 1/2015 | Ogawa ............. | G11B 20/10046 369/47.17 |
| 2017/0272212 | A1* | 9/2017 | Detwiler .............. | H04B 10/272 |
| 2019/0036550 | A1* | 1/2019 | Koike-Akino ..... | H03M 13/1108 |
| 2021/0194588 | A1* | 6/2021 | Wu ................... | H04L 25/03878 |

* cited by examiner

*Primary Examiner* — Dzung D Tran
(74) *Attorney, Agent, or Firm* — Harness, Dickey & Pierce, P.L.C.

(57) ABSTRACT

Embodiments of the present disclosure relate to a device, a method, an apparatus and a computer-readable medium for signal equalization. According to the embodiments of the present disclosure, a balance between equalization performance and effects is achieved by using a linear equalizer and a nonlinear equalizer. In addition, signals from different uplinks are equalized using adaptive parameters, to achieve optimal equalization of various signals.

13 Claims, 16 Drawing Sheets

METHOD, DEVICE, APPARATUS AND COMPUTER-READABLE MEDIUM FOR SIGNAL EQUALIZATION

CROSS-REFERENCE TO RELATED APPLICATIONS

The present application claims priority under 35 U.S.C. § 119 to Chinese Patent Application No. 202010002953.7, filed on Jan. 2, 2020, in the China National Intellectual Property Administration, the entire contents of which are hereby incorporated by reference.

FIELD

Embodiments of the present disclosure generally relate to the field of communication technology, and more specifically, to a method, device, apparatus and a computer-readable medium for equalizing optical signals.

BACKGROUND

Technologies for optical communications have been further developed in recent years. For example, proposals on signal equalization involving both PMD and TC have been released. Equalization now has become one of the hottest topics under discussion. Since severe signal distortion and even detection failure issues in high-speed serial signals caused by optical devices and optical fiber transmission cannot be recovered by using traditional feed-forward (FFE) equalization methods, equalization methods need to be improved.

SUMMARY

In general, the embodiments of the present disclosure relate to a method and corresponding electronic device for optical signal equalization.

In a first aspect, the embodiments of the present disclosure provide an electronic device. The electronic device comprises an input port configured to receive an optical signal in burst mode from a further electronic device. The electronic device comprises a conversion module configured to convert the optical signal in burst mode to an electric signal. The electronic device further comprises a first equalizer configured to perform linear equalization on the electric signal. The electronic device further comprises a second equalizer configured to perform neural network-based nonlinear equalization on the electric signal that has gone through linear equalization. The electronic device further comprises an output port configured to output the electric signal that has gone through nonlinear equalization.

In a second aspect, the embodiments of the present disclosure provide a method for optical signal equalization. The method comprises: at an electronic device, receiving an optical signal in burst mode from a further electronic device. The method further comprises converting the optical signal in burst mode to an electric signal. The method further comprises performing linear equalization on the electric signal. The method further comprises performing neural network-based nonlinear equalization on the electric signal that has gone through linear equalization. The method further comprises outputting the electric signal that has gone through nonlinear equalization.

In a third aspect, the embodiments of the present disclosure provide a computer-readable storage medium. The computer-readable storage medium comprises program codes stored thereon which, when executed by an apparatus, cause the apparatus to perform a method according to the second aspect.

In a fourth aspect, the embodiments of the present disclosure provide an electronic apparatus. The electronic apparatus comprises a component for receiving an optical signal in burst mode from a further electronic device. The electronic apparatus comprises a component for converting the optical signal in burst mode to an electric signal. The electronic apparatus further comprises a component for performing linear equalization on the electric signal. The electronic apparatus further comprises a component for performing neural network-based nonlinear equalization on the electric signal that has gone through linear equalization. The electronic apparatus further comprises a component for outputting the electric signal that has gone through nonlinear equalization.

In a fifth aspect, the embodiments of the present disclosure provide an electronic device. The electronic device comprises at least one processor and a memory coupled to the at least one processor. The memory stores instructions therein which, when executed by the at least one processor, cause the electronic device to perform a method according to the second aspect.

It should be understood that what is described in the summary is neither intended to limit the key or essential features of exemplary embodiments of the present disclosure, nor to limit the scope of the present disclosure. Other features of the present disclosure will become apparent through the following description.

BRIEF DESCRIPTION OF THE DRAWINGS

The foregoing and other features, benefits, and aspects of various embodiments of the present disclosure will become more apparent from the following detailed description with reference to the accompanying drawings, where.

Throughout the drawings, the same or similar reference numerals represent the same or similar elements.

DETAILED DESCRIPTION

Figure 1:
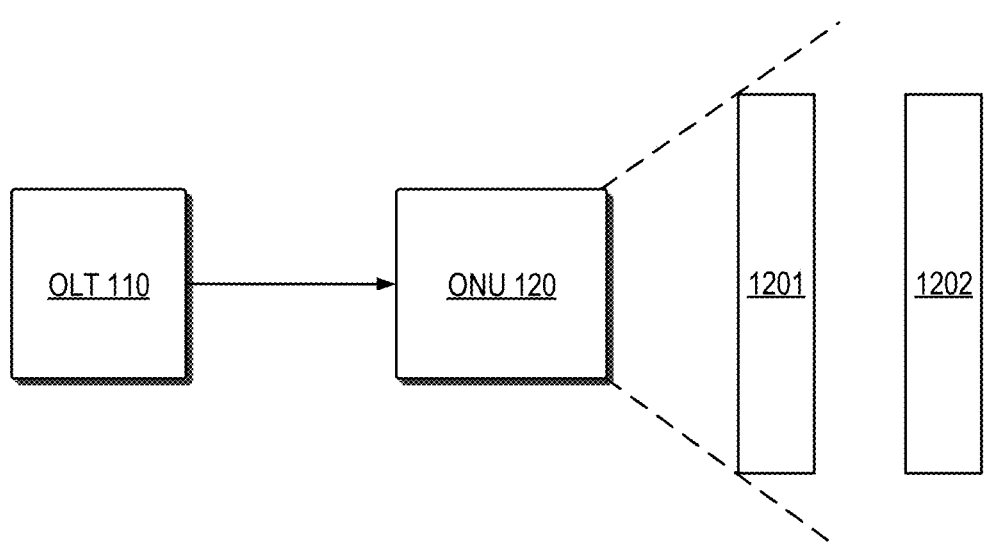
FIG. 1 shows an example block diagram of a traditional apparatus for signal equalization.

Embodiments of the present disclosure will be described in more details with reference to accompanying drawings, where some embodiments are illustrated. However, it should be understood that the present disclosure may be implemented in various ways and should not be construed as being limited to the embodiments illustrated herein. On the contrary, these embodiments are provided for a more thorough and complete understanding of the present disclosure. It should be understood that the drawings and embodiments of the present disclosure are only for the illustration purpose, rather than limiting the scope of the present disclosure.

The term "circuitry" used herein refers to one or more or all of the following:

(a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all use cases of this term in this application (including in any claims). As a further example, the term "circuitry' used herein also covers an implementation of merely a hardware circuit or a processor (or multiple processors), or a portion of a hardware circuit or a processor, and its (or their) accompanying software and/or firmware. The term "circuit" also covers, for example, and if applicable to a particular claim element, a baseband integrated circuit or a processor integrated circuit, or OLT, DPU or similar integrated circuits in other computing devices.

The term "optical line terminal (OLT)" used herein may refer to a local-end device, which may be connected with a front-end (convergence layer) switch by a cable, convert to an optical signal and interconnect with a user-end optical splitter by a single optical fiber. The term "optical network unit (ONU)" used herein may refer to a communication device, which selectively receives broadcasts sent by an OLT and responds to the OLT if the data needs to be received; collects and caches Ethernet data which a user needs to send and sends the cached data to the OLT according to an allocated transmission window.

As used herein, the terms "comprise," "include" and variants thereof are intended to be inclusive, i.e. "including but not limited to." The term "based on" is intended to include "based at least in part on." The term "one embodiment" is intended to include "at least one embodiment." The term "a further embodiment" is intended to include "at least one further embodiment." Relevant definitions of other terms will be provided in the following description may also.

As described above, using traditional feed forward (FFE) equalization methods may cause severe signal degradation and even detection failure issues. Generally, conflicts between equalization effectiveness and digital signal processing (DSP) complexity needs to be considered during signal equalization. In order to solve the above problems, traditional equalization solutions may broadly be divided into two categories, linear and nonlinear.

FIG. 1 shows an example structure of linear equalization. An ONU 120 receives an optical signal from an OLT 110, and then a photodetector converts the optical signal to an electric signal and equalizes the electric signal. Zero forcing (ZF) or least mean square (LMS) are two representative algorithms of traditional linear FFE solutions which are currently adopted in point-to-point high-speed serial communications, but the effectiveness is restricted within linear-scope and instinctively lacks universality and adaptivity to diverse ONUs in multi-user uplink in a PON network. As shown in FIG. 1, an equalizer in the ONU 120 may comprise two parts, an input layer 1201 and an output layer 1202. For example, the input layer 1201 may have 26 taps, and the output layer has 1 tap. Therefore, the complexity is mainly determined by multiplication in weighted operation, which is 26*1.

Figure 2:
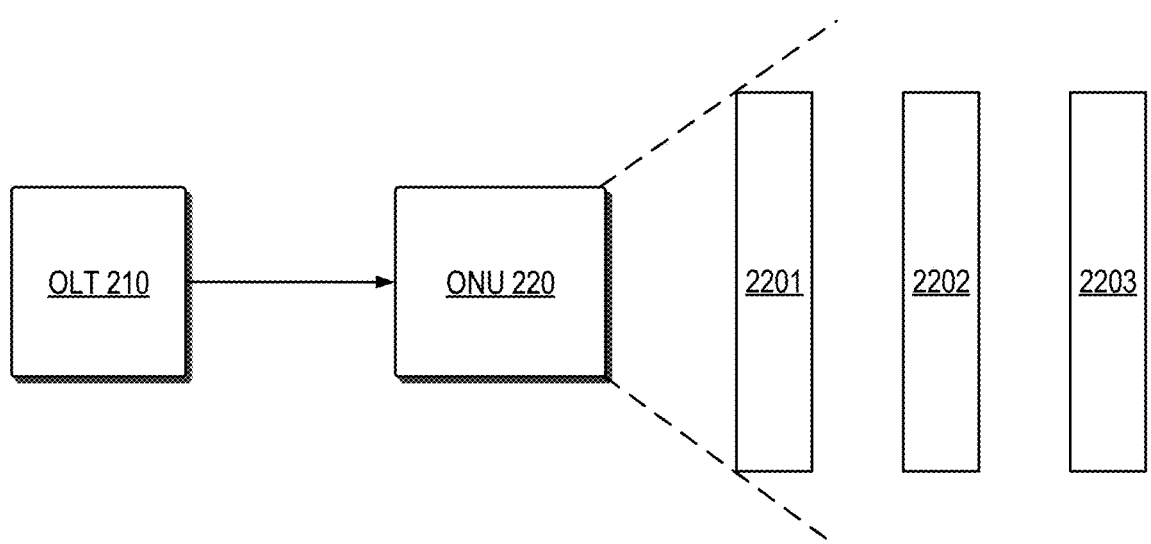
FIG. 2 shows an example block diagram of a traditional apparatus for signal equalization.

FIG. 2 shows an example structure of non-linear equalization. An ONU 220 receives an optical signal from an OLT 210, and then a photodetector converts the optical signal to an electric signal and performs non-linear equalization on the electric signal. The performance of neural network (NN) based equalization has been improved. However, at a cost, nonlinear equalization is relatively DSP-intensive. As shown in FIG. 2, an equalizer in the ONU 220 may comprise three parts, an input layer 2201, a nonlinear layer 2202 and an output layer 2203. For example, the input layer 2201 may have 26 neurons, the nonlinear layer may have four neurons and the output layer has 1 neuron. Therefore, the complexity is 26*4*1. It can be seen that the equalization structure in FIG. 2 has better performances but higher complexity.

In addition, in uplink from ONU to OLT, OLT receives signals from a plurality of ONUs (e.g., 64 ONUs), which are very diverse in component and channel conditions. For example, affected by optical devices and optical link channels of different ONUs, burst signals received in OLT are differently distorted, and cannot be adaptively and effectively equalized/recovered by a regular linear FFE equalization (e.g., linear FEE).

Figure 3:
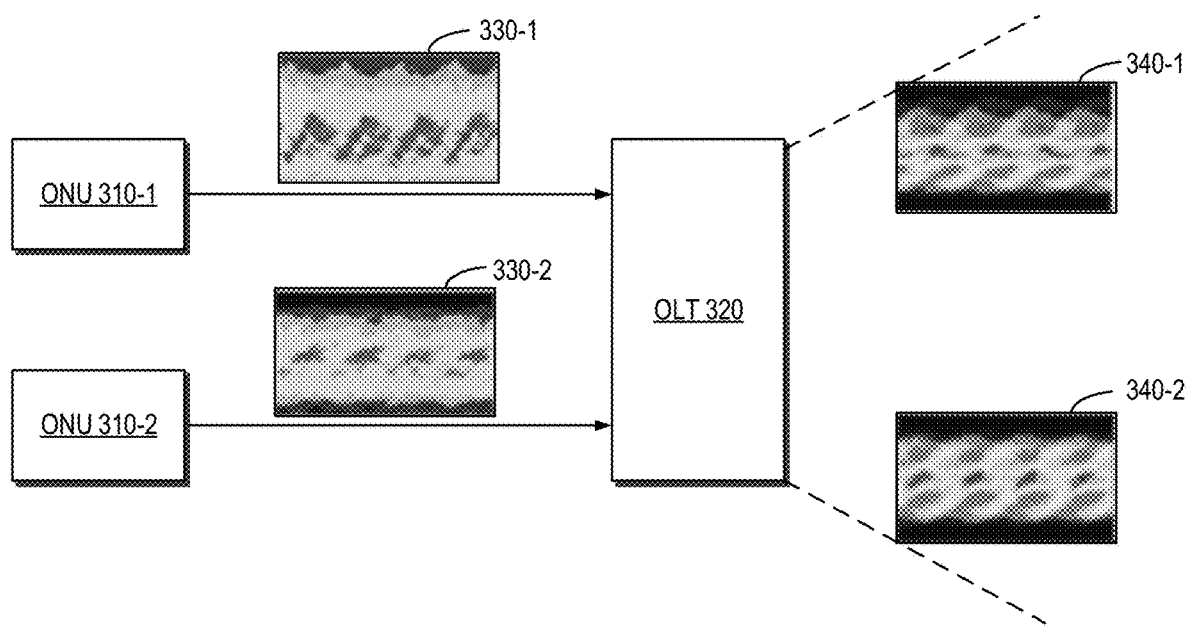
FIG. 3 shows an example block diagram of a traditional apparatus for signal equalization.

As shown in FIG. 3, an OLT 320 receives a signal 330-1 from an ONU 310-1 and receives a signal 330-2 from an ONU 310-2. Due to the difference of channel performance, the signals 330-1 and 330-2 are differently distorted. The OLT 320 equalizes the signal 330-1 to obtain a signal 340-1 and equalizes the signal 330-2 to obtain a signal 340-2. As described above, since the signals 330-1 and 330-2 are differently distorted, the signals 340-1 and 340-2 after equalization by the OLT 320 also have different characteristics and fail to achieve ideal equalization effectiveness.

Therefore, there is a need for a new equalization method and device to achieve better equalization effectiveness. According to embodiments of the present disclosure, a balance is achieved between equalization performances and complexity by using a linear equalizer and a nonlinear equalizer. In addition, embodiments of the present disclosure may further recover distorted signals.

Figure 4:
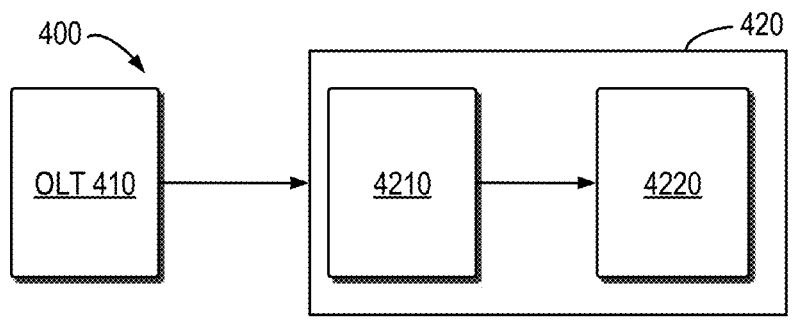
FIG. 4 shows an example block diagram of a signal equalization system according to embodiments of the present disclosure.
Figure 5:
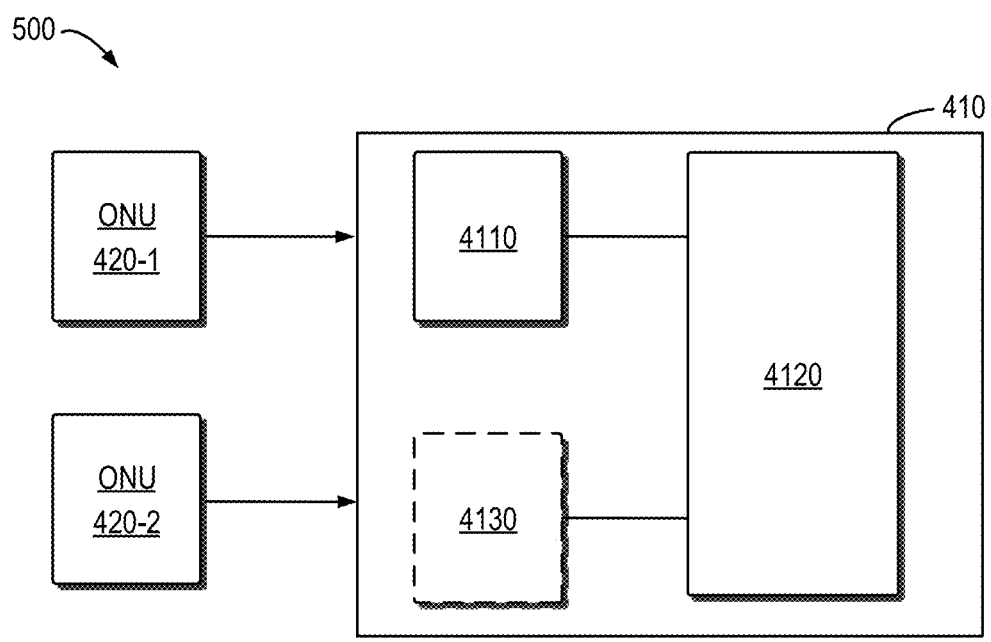
FIG. 5 shows an example block diagram of a signal equalization system according to embodiments of the present disclosure.

FIGS. 4 and 5 show block diagrams of example signal equalization systems 400 and 500 according to embodiments of the present disclosure, respectively. Communication in the systems 400 and 500 may follow any appropriate wireless communication technology and corresponding communication standard. Examples of communication technology include, but are not limited to, Long-Term Evolution (LTE), LTE-Advanced (LTE-A), Wideband Code Division Multiple Access (WCDMA), Code Division Multiple Access (CDMA), Global System for Mobile Communications (GSM), Orthogonal Frequency Division Multiplexing (OFDM), Wireless Local Area Network (WLAN), World Interoperability for Microwave Access (WiMAX), Bluetooth, Zigbee technology, Machine Type Communication (MTC), D2D, or M2M, etc. Moreover, communication may be performed according to any appropriate communication protocols, which include, but are not limited to, Transmission Control Protocol (TCP)/Internet Protocol (IP), Hypertext Transfer Protocol (HTTP), User Datagram Protocol (UDP), Session Description Protocol (SDP) and other protocols.

FIG. 4 shows a downlink system 400, which has an OLT 410 and an ONU 420. The ONU 420 may receive a signal from the OLT 410 and equalize the received signal. It may be understood that the number of respective components shown in FIG. 4 is merely an example and not limiting. The ONU 420 has a first equalizer 4210 and a second equalizer 4220. The first equalizer 4210 may be a linear equalizer, which may tackle the main linear channel impairment. The second equalizer 4220 may be a nonlinear equalizer, which may tackle the main nonlinear channel impairment. The first equalizer 4210 and the second equalizer 4220 may be combined to balance the equalization effectiveness and the DSP complexity. A first equalizer 5210 is long enough to absorb channel memory issues, and a second equalizer 5220 is robust against nonlinear issues. The system 400 has better performances over a linear equalizer and lower complexity over a nonlinear equalizer. It should be understood that in uplink, the first equalizer 4210 and the second equalizer 4220 may also be implemented in the OLT 410.

FIG. 5 shows an uplink system 500, the system 500 comprising an OLT 410, an ONU 420-1 and an ONU 420-2. It may be understood that the number of respective components shown in FIG. 5 is merely exemplary and not limiting. The OLT 410 may receive signals from the ONU 420-1 and ONU 420-2 respectively and equalize the received signals. The OLT 410 has a first equalizer 4110 and a second equalizer 4120. Similarly, the first equalizer 4110 may be a linear equalizer, which may tackle the main linear channel impairment. The second equalizer 4120 may be a nonlinear equalizer, which may tackle the main nonlinear channel impairment. The first equalizer 4110 and the second equalizer 4120 may be combined to balance the equalization effectiveness and the DSP complexity. The first equalizer 4110 is long enough to absorb channel memory issues, and the second equalizer 4120 is robust against nonlinear issues. The system 500 has better performance over a linear equalizer and lower complexity over a nonlinear equalizer.

As shown in FIG. 5, the OLT 410 further comprises an ONU identifying module 4130. The ONU identifying module 4130 may identify different ONUs and can customize equalization for each ONU. The second equalizer 4120 may equalize signals according to different ONUs identified by the ONU identifying module 4130.

Figure 6:
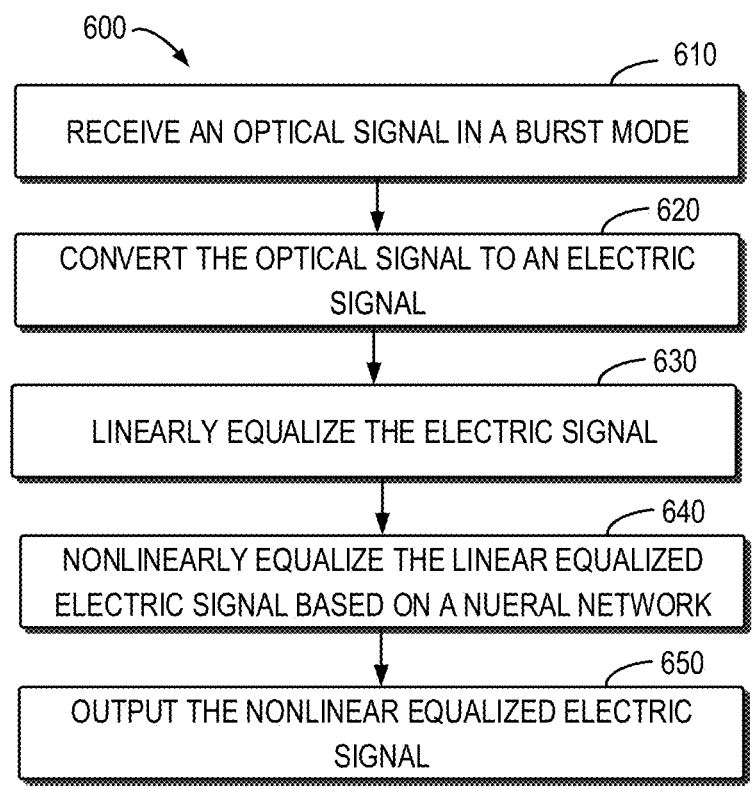
FIG. 6 shows a flowchart of an example method according to embodiments of the present disclosure.
Figure 7:
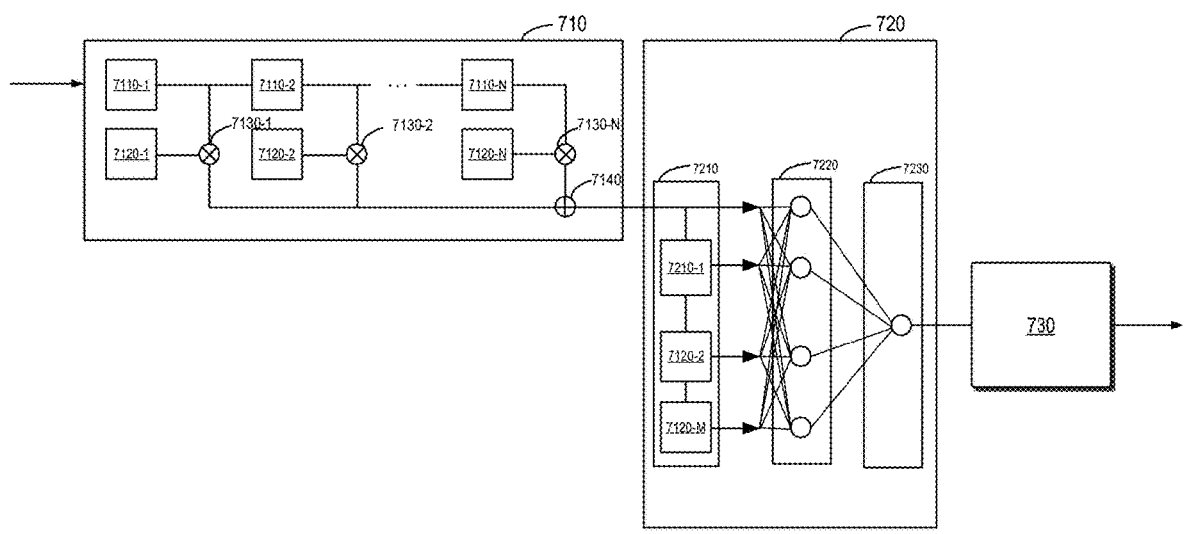
FIG. 7 shows an example block diagram of an apparatus for signal equalization according to embodiments of the present disclosure.
Figure 8:
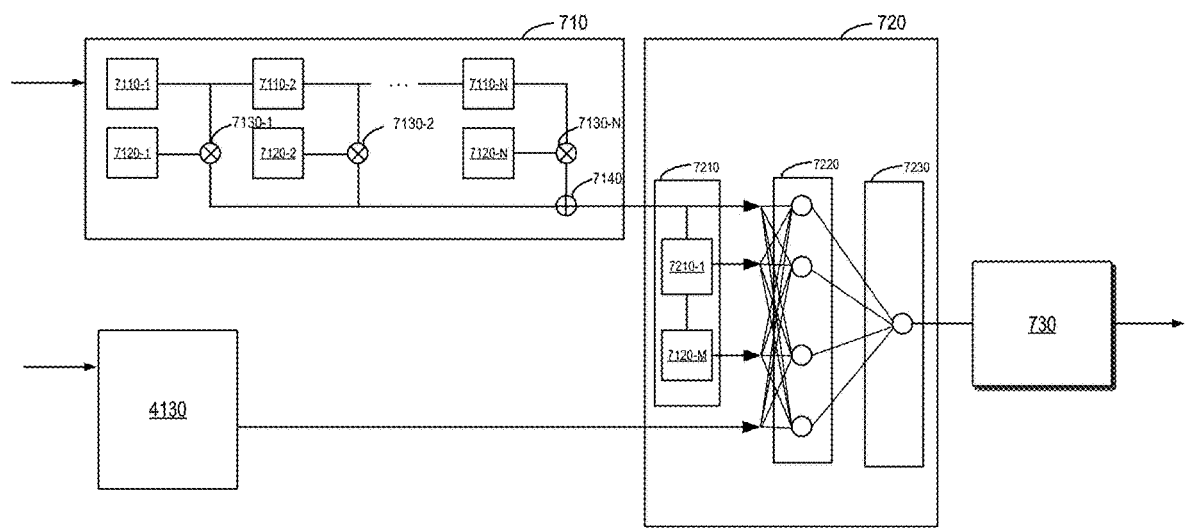
FIG. 8 shows an example block diagram of an apparatus for signal equalization according to embodiments of the present disclosure.

FIG. 6 shows a flowchart of a method 600 according to embodiments of the present disclosure. The method 600 may be implemented in any appropriate electronic device, e.g., the OLT 410 and/or ONU 420. FIGS. 7 and 8 show a linear equalizer 710 and a nonlinear equalizer 720 according to the embodiments of the present disclosure, respectively. The linear equalizer 710 may correspond to the first equalizer 4110 and the first equalizer 4210. The nonlinear equalizer 720 may correspond to the second equalizer 4120 and the second equalizer 4220. The method 600 may be described with reference to FIGS. 7 and 8.

At block 610, an electronic device may receive an optical signal in a burst mode from a further electronic device. For example, the OLT 410 may receive an uplink optical signal in the burst mode from the ONU 420. The ONU 420 may receive a downlink optical signal in the burst mode from the OLT 410.

At block 620, the electronic device converts the optical signal in the burst mode into an electric signal. For example, the electronic device may comprise a conversion module, for example, a photoelectric detector, which is configured to convert an optical signal into an electric signal.

At block 630, the electronic device (for example, the OLT 410 or the ONU 420) performs linear equalization on the converted electric signal. In some embodiments, the linear equalization may be uniform. In some embodiments, the linear equalizer 710 may linearly equalize on the electric signal. As shown in FIGS. 7 and 8, the linear equalizer 710 comprises a delay module 7110, e.g., a delay module 7110-1, a delay module 7110-2, . . . , a delay module 7110-N, wherein N is any positive integer. The delay module 7110 may delay the electric signal in the burst mode. In some embodiments, the linear equalizer 710 further comprises a sampling module to sample a plurality of delayed signals.

The linear equalizer 710 may further comprise a weight module 7120, for example, a weight module 7120-1, a weight module 7120-2, . . . , a weight module 7120-N, wherein N is any positive integer. The weight module 7120-2 may determine tap weights of a plurality of bits of the electric signal. The linear equalizer 710 may further comprise a multiplexing module 7130, for example, a multiplexing module 7130-1, a multiplexing module 7130-2, . . . , a multiplexing module 7130-N, wherein N is any positive integer. The multiplexing module 7130 may perform weighting operations on the sampled electric signal and sampling weights. The linear equalizer 710 further comprises a combining module 7140 to combine multiplexed signals for further nonlinear equalization.

At block 640, the electronic device (e.g., the OLT 410 or the ONU 420) nonlinearly equalize the linear equalized electric signal based on a neural network. In some embodiments, the linear equalizer 720 may perform nonlinear equalization on the electric signal which has gone through linear equalization. In some embodiments, the nonlinear equalization may be undifferentiated and uniform. In other embodiments, the nonlinear equalization may also be adaptive nonlinear equalization based on a sub neural network with the function of identifying a sending device.

As shown in FIGS. 7 and 8, the nonlinear equalizer 720 comprises an input layer module 7210. The input layer module 7210 may convert the linear equalized electric signals into parallel electric signals. The input layer module 7210 may have a plurality of delay modules 7210 for serial-to-parallel conversion, e.g., a delay module 7210-1, a delay module 7210-2, . . . , a delay module 7210-M, wherein M is any positive integer. For example, the delay length is reversely proportional to the line baud rate, e.g., 0.2e-10 s in 50G case.

The nonlinear equalizer 720 further comprises a hidden layer module 7220. In some embodiments, the hidden layer module 7220 comprises neurons with nonlinear activation function, sigmoid or any other nonlinear polynomial. The hidden layer module 7220 may perform nonlinear equalization on parallel electric signals. It may be understood that the number of hidden layers may be any appropriate number.

In some embodiments, the nonlinear equalizer 720 further comprises an output layer module 7230. For example, the output layer module 7230 may be equalized output. In some embodiments, the output of the output layer module 7230 may further be fed to a maximal likelihood sequence estimation (MLSE) module 730. The interconnections between layer modules are the weights and biases, which need to be trained up during training phase. In some embodiments, these parameters may be fixed for the real-time running of real payloads. The nonlinear equalizer parameters perhaps need to be fine-tuned over time against the chronic environment changes.

In some embodiments, in uplink, as shown in FIG. 8, the above ONU identifying module 4130 may further be comprised. The ONU identifying module 4130 may be used as a passive optical network unit (PON) distinguisher and determine equalization functions of different OLTs for various ONUs. The ONU identifying module 4130 may comprise an identifying module to determine ONU identity, and a determining module to determine parameters for nonlinear equalization based on ONU identity. The ONU identifying module 4130 may calculate identity of the ONU through a sub neural network. The term "identity" used herein may refer to a link weight value between a sub neural network and a main neural network.

In some embodiments, the nonlinear equalization 720 may further determine parameters for nonlinear equalization through training and calculation based on an identity of a further electronic device. The nonlinear equalizer 720 may further perform nonlinear equalization on the electric signal based on determined parameters for nonlinear equalization.

In some embodiments, it is necessary to collect training symbols from different ONUs through different channels, and the training data may be batched to train three function parts (FFE, encoder-nonlinear (NN) and booster-NN). Once trained up, the parameters in FFE and booster-NN are fixed up, and the whole encoder-NN may be replaced by its output.

At block 650, the electronic device (e.g., the OLT 410 or the ONU 420) outputs a nonlinear equalized electric signal. The electronic device may comprise an output port. The output port may comprise the above maximal likelihood sequence estimation (MLSE) module 730 and an output module to output an electric signal on which the maximal likelihood sequence estimation has been performed.

In some embodiments, an electronic apparatus (e.g., the OLT 410 and the ONU 420) capable of performing the method 600 may comprise corresponding means for performing various steps of the method 600. These means may be implemented in any appropriate way, for example, through circuit or software modules.

In some embodiments, the electronic apparatus comprises means for receiving an optical signal in a burst mode from a further electronic device; means for converting the optical signal in the burst mode to an electric signal; means for linearly equalizing the electric signal; means for nonlinearly equalizing the linear equalized electric signal based on a neural network; and means for outputting the nonlinear equalized electric signal.

In some embodiments, the means for linearly equalizing the electric signal comprises: means for delaying the electric signal; means for sampling the delayed electric signal; means for determining tap weights of a plurality of bits of the electric signal; and means for performing weighting calculation on the sampled electric signal and the tap weights.

In some embodiments, the means for nonlinearly equalizing the linear equalized electric signal based on a neural network comprises: means for converting the linear equalized electric signal from serial to parallel; and means for nonlinearly equalizing the parallel electric signal through a plurality of neurons.

In some embodiments, the means for p nonlinearly equalizing the linear equalized electric signal based on a neural network comprises: means for in accordance with a determination that the optical signal in the burst mode is an uplink signal, determining an identity of the further electronic device through a sub neural network, the identity being a link weight value between the sub neural network and a main neural network; means for determining, based on the identity of the further electronic device, a parameter of nonlinear equalization by training and calculation; and means for nonlinearly equalizing the linear equalized electric signal based on the parameter of nonlinear equalization.

In some embodiments, the component for outputting the nonlinear equalized electric signal comprises means for performing a maximal likelihood sequence estimation on the nonlinear equalized electric signal; and means for outputting the electric signal on which the maximal likelihood sequence estimation has been performed.

In some embodiments, the electronic device is an optical network module and the further electronic device is an optical line terminal, or the electronic device is an optical line terminal and the further electronic device is an optical network module.

Figure 9:
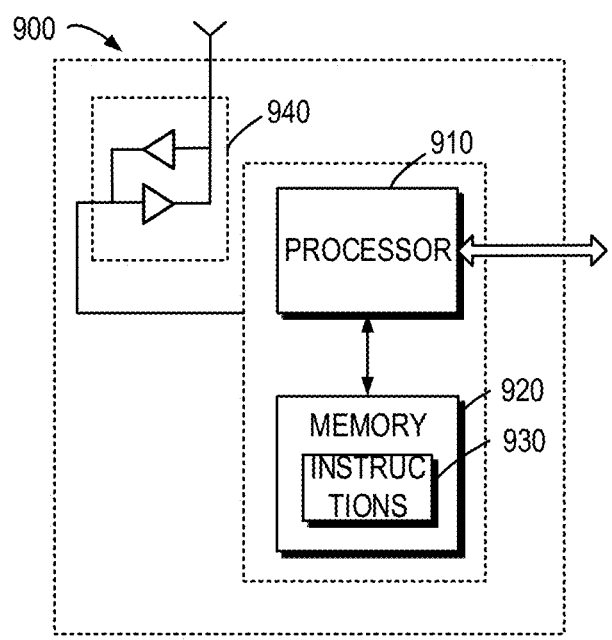
FIG. 9 shows a block diagram of a communication device according to some embodiments of the present disclosure.

FIG. 9 is a block diagram of a device 900 according to the embodiments of the present disclosure. As depicted, the device 900 includes one or more processors 910, one or more memories 920 coupled to the processor(s) 910, and one or more transmitters and/or receivers (TX/RX) 940 coupled to the processor 910.

The processor 910 may be of any type suitable to the local technical environment, and may include one or more of the following: general-purpose computers, special-purpose computers, microprocessors, digital signal controllers (DSPs), and processors based multicore processor architecture. The device 900 may include multiple processors, such as an application specific integrated circuit chip that is slaved in time to a clock which synchronizes the main processor.

The memory 920 may be of any type suitable to the local technical environment and may be implemented using any appropriate data storage technique, as non-limiting examples, such as a non-transitory computer-readable storage medium, a semiconductor-based storage device, a magnetic memory device and system, an optical memory device and system, an unremovable memory and a removable memory.

Figure 10:
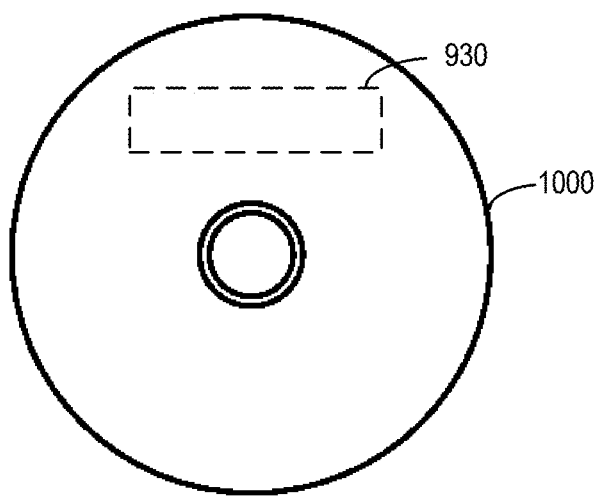
FIG. 10 shows a block diagram of an example computer-readable medium according to some embodiments of the present disclosure.

The memory 920 stores at least one part of an instruction 930. The TX/RX 640 is used for two-way communication. The TX/RX 940 has at least one antenna for facilitating communication. The TX/RX 940 may support optical fiber communication. The communication interface may represent any interface necessary for communication with other devices. FIG. 10 shows an example of the computer readable medium 1000 in form of an optical storage disk. The computer readable medium has the program 930 stored thereon.

The instruction 930 is supposed to include a program instruction which, when executed by the associated processor 910, causes the device 900 to operate according to the embodiments described with reference to FIG. 6. That is, the embodiments of the present disclosure may be implemented by computer software, hardware or a combination of software and hardware.

FIGS. 11 to 16 show comparison views of simulation and experimental performance results between embodiments of the present disclosure and traditional techniques. Simulation and experiment parameters are as shown in Table 1.

TABLE 1

|  | Simulation | Experiments |
| --- | --- | --- |
| Fiber length | | 20 km |
| Baud rate | | 50 Gb/s NRZ |
| Filter BW-pass | 20 G | 20 GHz brick wall cut off |
| Center wavelength | | 1550 nm |
| Dispersion coefficiency | 17 ps/(nm · km) | SSMF-28 |
| Mod/deMod | | IM/DD, MZM/PIN |
| Equalization types | | Complexity |
| FFE | | 26*1 |
| Hybrid (the present disclosure) | | FFE (20*1) + NN (6*4*1) |
| Nonlinear-Short | | NN (6*4*1) |
| Nonlinear-Long | | NN (26*4*1) |

Figure 11:
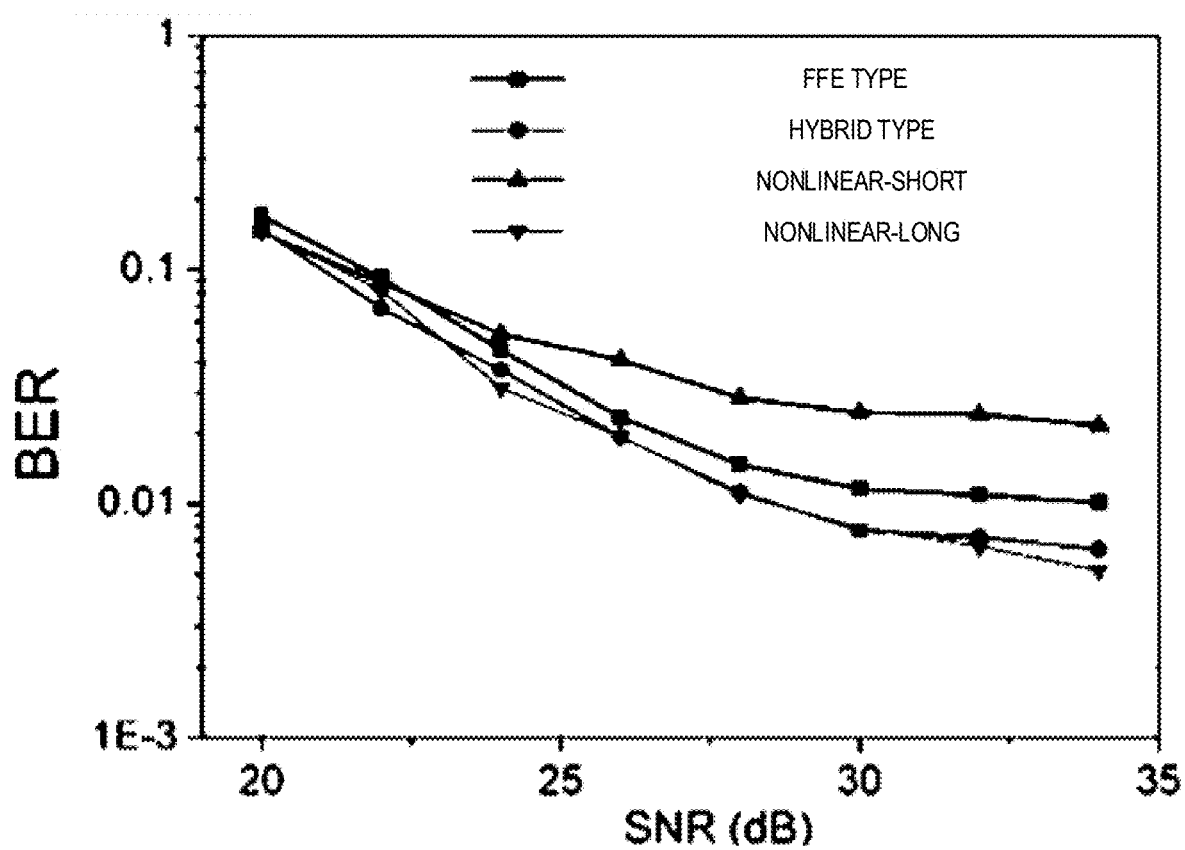
FIG. 11 shows a comparison view of simulation performance results between embodiments of the present disclosure and traditional techniques.
Figure 12:
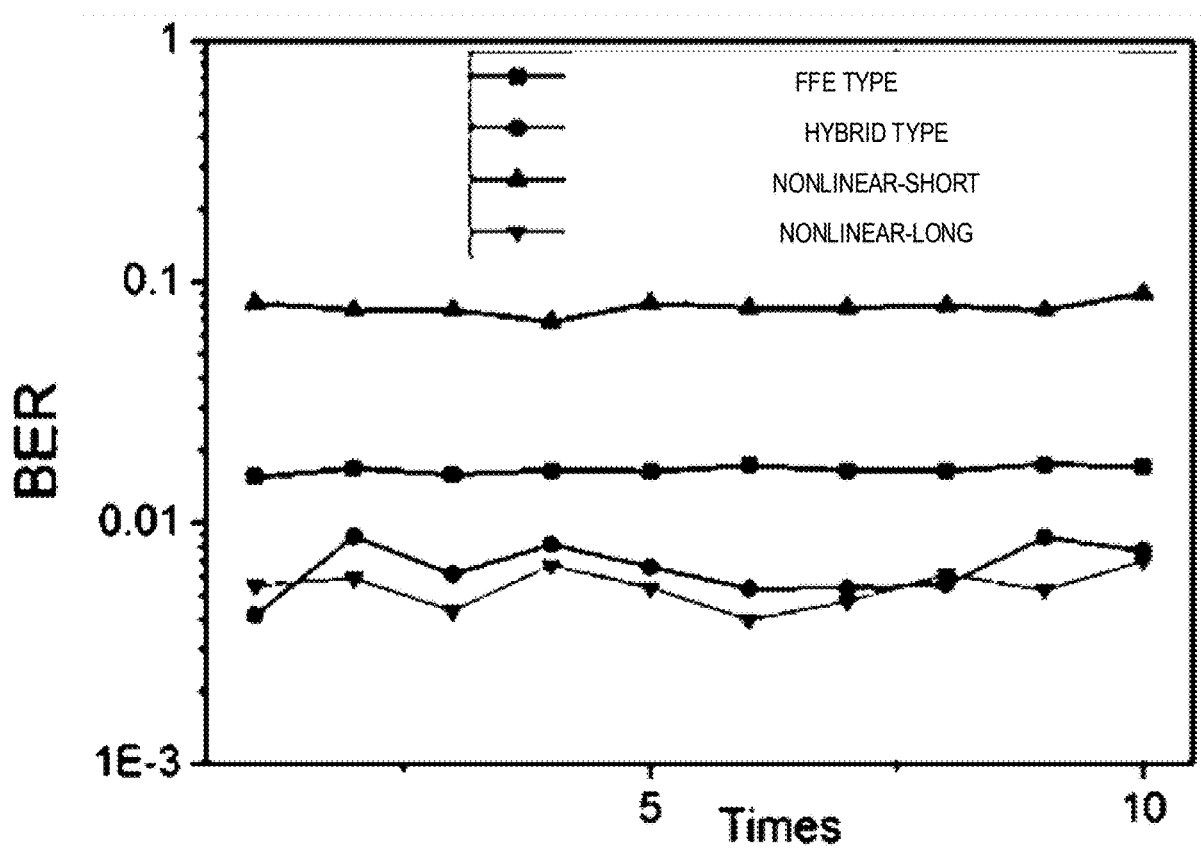
FIG. 12 shows a comparison view of experimental performance results between embodiments of the present disclosure and traditional techniques.

FIG. 11 shows simulation results, and FIG. 12 shows experimental results. Bit error rate (BER) curves in FIG. 11 are derived by varying the signal to noise rate (SNR), and SNR is kept constant in FIG. 12. Both results in FIGS. 11 and 12 indicate that the linear FFE can provide modest equalization effects, effects of the nonlinear-short equalizer are dissatisfactory, while effects of the nonlinear-long equalizer and the equalizer of the present disclosure are obviously stronger than the former two types.

Figure 13:
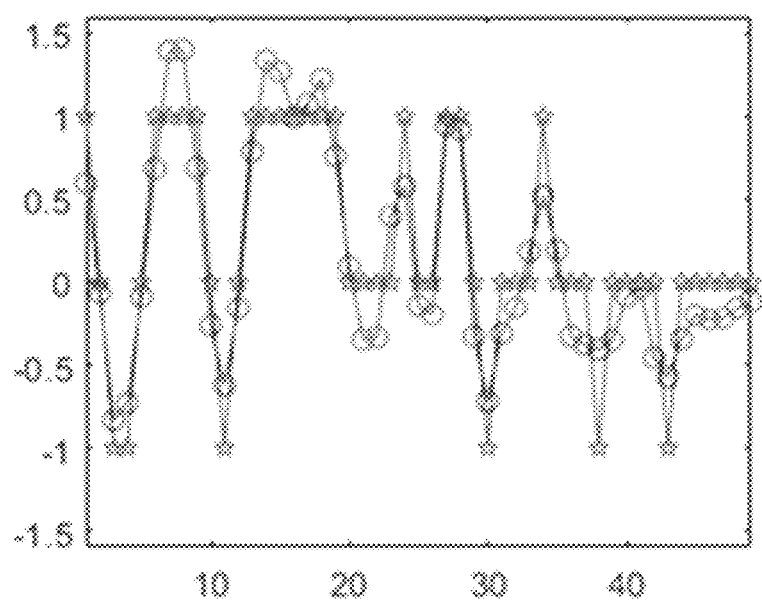
FIG. 13 shows a performance view of a traditional equalizer.
Figure 14:
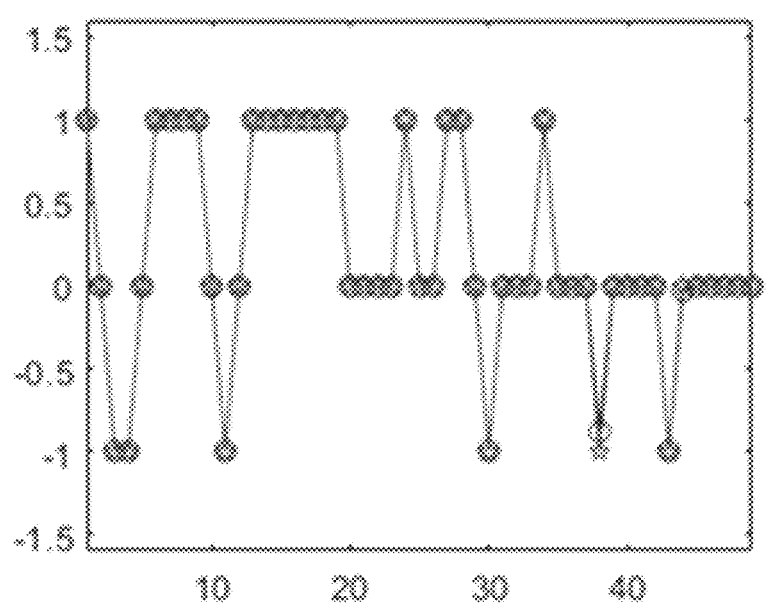
FIG. 14 shows a performance view of an equalizer according to embodiments of the present disclosure.
Figure 15:
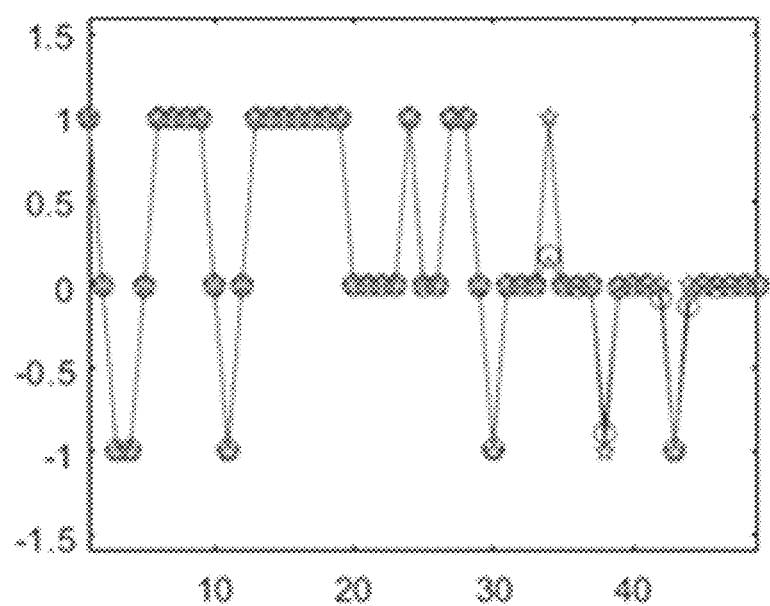
FIG. 15 shows a performance view of a traditional equalizer.
Figure 16:
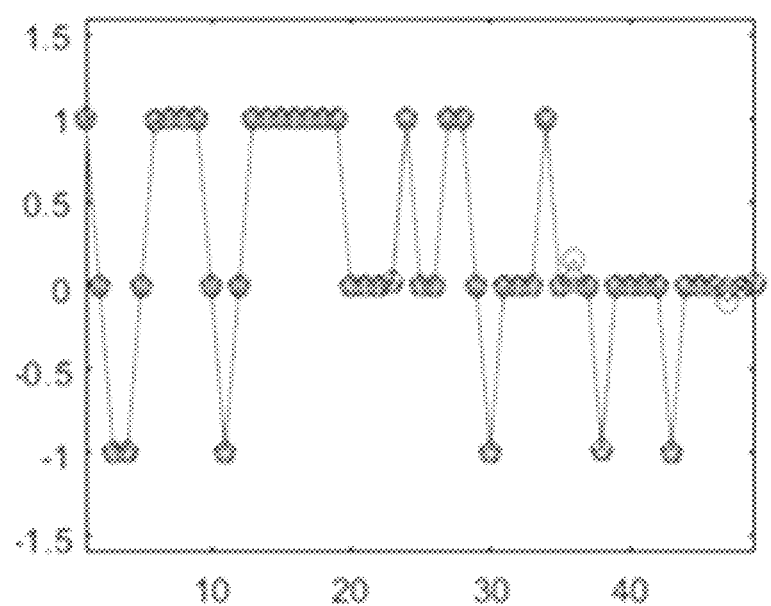
FIG. 16 shows a performance view of a traditional equalizer.

In order to compare waveforms of the four different equalization methods in a more detailed way, FIGS. 13 to 16 show results of the above four equalizer types, wherein the horizontal axis is time, and the vertical axis is amplitude. FIG. 13 shows a result of the FFE equalizer, FIG. 14 shows a result of the hybrid equalizer, FIG. 15 shows a result of the nonlinear-short equalizer, and FIG. 16 shows a result of the nonlinear-long equalizer. It can be seen that the equalizer according to the embodiments of the present disclosure (FIG. 14) has similar effects to the nonlinear-long equalizer (FIG. 16), whereas the complexity of the embodiments of the present disclosure (e.g., 20*1+6*4*1) is obviously lower than that of the nonlinear-long equalizer (e.g., 26*4*1).

Generally, various example embodiments of the present disclosure may be implemented in hardware or special purpose circuits, software, logic, or any combination thereof. Some aspects may be implemented in hardware, while other aspects may be implemented in firmware or software that may be executed by a controller, microprocessor, or other computing devices. While various aspects of embodiments of the present disclosure are illustrated and described as block diagrams, flowcharts, or using some other pictorial representations, it is to be understood that the blocks, devices, systems, techniques, or methods described herein may be implemented in, as non-limiting examples, hardware, software, firmware, special-purpose circuits or logic, general purpose hardware or a controller or other computing devices, or some combination thereof.

As one example, the embodiments of the present disclosure may be described in the context of machine-executable instructions, such as those included in program modules, which are executed in a device on a target real or virtual processor. Generally speaking, the program modules include a routine, a program, a library, an object, a class, a component, a data structure, etc., which perform a particular task or implement a particular abstract data structure. In various exemplary embodiments, functions of the program modules may be merged or divided between the described program modules. Machine-executable instructions for program modules can be executed locally or in distributed devices. In distributed devices, the program modules may be located in both a local storage medium and a remote storage medium.

Computer program codes for implementing the method of the present disclosure may be written in one or more programming languages. These computer program codes may be provided to a processor of a general-purpose computer, a special-purpose computer, or other programmable data processing apparatus, so that the program codes, when executed by the computer or other programmable data processing apparatus, cause the functions/operations specified in the flowchart and/or block diagram to be implemented. The program codes may execute entirely on a computer, partly on a computer, as an independent software package, partly on a computer and partly on a remote computer, or entirely on a remote computer or server.

In the context of the present disclosure, the computer program codes or related data may be carried by any suitable carrier to cause a device, an apparatus, or a processor to perform various processes and operations as described above. Examples of carriers include a signal, a computer-readable medium, and the like.

Examples of the signal may include an electrical signal, an optical signal, radio, sound, or propagated signals in other forms, such as a carrier wave, an infrared signal, and the like.

In the context of the present disclosure, the machine-readable medium may be any tangible medium containing or storing a program used for or related to an instruction executing system, an apparatus or a device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination thereof. More detailed examples of the machine-readable storage medium include an electrical connection with one or multiple wires, a portable computer magnetic disk, a hard disk, a random access memory (RAM), a read-only memory (ROM), an erasable programmable ROM (EPROM or flash memory), an optical storage device, a magnetic storage device, or any suitable combination thereof.

In addition, although the operations are depicted in a particular order, this should not be construed as requiring or suggesting that such operations are required to be performed in the particular order or that all illustrated operations are required to be performed to achieve desirable results. On the contrary, the steps depicted in the flowchart may be performed in a different order. Additionally or alternatively, some steps may be omitted, a plurality of steps may be combined into one step, and/or one step may be decomposed into a plurality of steps. Further, it should be noted that features and functions of two or more apparatuses of the present disclosure may be embodied in one apparatus, and vice versa, features and functions of one apparatus may further be embodied in a plurality of apparatuses.

Although the present disclosure has been described with reference to several embodiments, it should be understood that the present disclosure is not limited to the specific embodiments disclosed herein. The present disclosure is intended to cover various modifications and equivalent arrangements included within the spirit and scope of the claims as appended.

We claim:

1. An electronic device, comprising:
an input port configured to receive an optical signal in a burst mode from a further electronic device;
a conversion module configured to convert the optical signal in the burst mode to an electric signal;
a first equalizer configured to linearly equalize the electric signal;
a second equalizer configured to nonlinearly equalize the linear equalized electric signal based on a neural network; and
an output port configured to output the nonlinear equalized electric signal, wherein the second equalizer further comprises
an input layer module, comprising a delay module and configured to convert the linear equalized electric signal from serial to parallel, and
a hidden layer module, comprising a neural module and configured to nonlinearly equalize the parallel electric signal.

2. The electronic device of claim 1, wherein the first equalizer comprises:
a delay module configured to delay the electric signal;
a sampling module configured to sample the delayed electric signal;
a weight module configured to determine tap weights of a plurality of bits of the electric signal; and
a calculation module configured to perform weighting calculation on the sampled electric signal and the tap weights.

3. The electronic device of claim 1, further comprising:
an identifying module configured to determine an identity of the further electronic device, the identity being a link weight value between a sub neural network and a main neural network;
a determining module configured to determine, based on the identity of the further electronic device, a parameter of nonlinear equalization by training and calculation; and
the second equalizer further configured to nonlinearly equalize the linear equalized electric signal based on the parameter of nonlinear equalization.

4. The electronic device of claim 1, wherein the output port further comprises:
a maximal likelihood sequence estimation module configured to perform a maximal likelihood sequence estimation on the nonlinear equalized electric signal; and
an output module configured to output the electric signal on which the maximal likelihood sequence estimation has been performed.

5. The electronic device of claim 1, wherein the electronic device is an optical network module and the further electronic device is an optical line terminal, or the electronic device is an optical line terminal and the further electronic device is an optical network module.

6. A method for signal equalization, comprising:
receiving, at an electronic device, an optical signal in a burst mode from a further electronic device;
converting the optical signal in the burst mode to an electric signal;
linearly equalizing the electric signal;
nonlinearly equalizing the linear equalized electric signal based on a neural network; and
outputting the nonlinear equalized electric signal,
wherein nonlinearly equalizing the linear equalized electric signal based on a neural network comprises
converting the linear equalized electric signal from serial to parallel, and
nonlinearly equalizing the parallel electric signal through a plurality of neurons.

7. The method of claim 6, wherein linearly equalizing the electric signal comprises:
delaying the electric signal;
sampling the delayed electric signal;
determining tap weights of a plurality of bits of the electric signal; and
performing weighting calculation on the sampled electric signal and the tap weights.

8. The method of claim 6, wherein nonlinearly equalizing the linear equalized electric signal based on a neural network comprises:
in accordance with a determination that the optical signal in the burst mode is an uplink signal, determining an identity of the further electronic device through a sub neural network, the identity being a link weight value between the sub neural network and a main neural network;
determining, based on the identity of the further electronic device, a parameter of nonlinear equalization by training and calculation; and
nonlinearly equalizing the linear equalized electric signal based on the parameter of nonlinear equalization.

9. The method of claim 6, wherein outputting the nonlinear equalized electric signal comprises:
performing a maximal likelihood sequence estimation on the nonlinear equalized electric signal; and
outputting the electric signal on which the maximal likelihood sequence estimation has been performed.

10. The method of claim 6, wherein the electronic device is an optical network module and the further electronic device is an optical line terminal, or the electronic device is an optical line terminal and the further electronic device is an optical network module.

11. A non-transitory computer-readable medium, storing instructions thereon which, when executed by at least one processing unit of a machine, cause the machine to perform a method according to claim 6.

12. An electronic device, comprising:
at least one processor; and
a memory coupled to the at least one processor, the memory storing instructions thereon which, when executed by the at least one processor, cause the electronic device to perform a method according to claim 6.

13. An electronic apparatus, comprising:
means for receiving an optical signal in a burst mode from a further electronic device;
means for converting the optical signal in the burst mode to an electric signal;
means for linearly equalizing the electric signal;
means for nonlinearly equalizing the linear equalized electric signal based on a neural network; and means for outputting the nonlinear equalized electric signal,
wherein the means for non-linearly equalizing the linear equalized electric signal includes an input layer module, comprising a delay module and configured to convert the linear equalized electric signal from serial to parallel, and
the means for non-linearly equalizing the linear equalized electric signal includes a hidden layer module, comprising a neural module and configured to nonlinearly equalize the parallel electric signal.

* * * * *